United States Patent [19]

Mitchell et al.

[11] 4,146,524

[45] Mar. 27, 1979

[54] POLYCARBONATE COMPOSITIONS

[75] Inventors: Lawrence C. Mitchell, Mt. Vernon; Steven W. Scott, Evansville, both of Ind.

[73] Assignee: General Electric Company, Pittsfield, Mass.

[21] Appl. No.: 857,186

[22] Filed: Dec. 2, 1977

[51] Int. Cl.$^2$ ............................................. C08L 91/00
[52] U.S. Cl. ................................. 260/28 P; 260/28 R; 260/28.5 R; 260/33.8 R; 260/45.7 S; 260/873; 260/45.95 G
[58] Field of Search .................... 260/28 P, 28 R, 873, 260/28.5 R, 33.8 R, 45.7 SF, 45.95 G

[56] References Cited

U.S. PATENT DOCUMENTS

| | | |
|---|---|---|
| 3,028,365 | 4/1962 | Schnell et al. ........................... 260/47 |
| 3,334,154 | 8/1967 | Kim ........................................ 260/860 |
| 3,915,926 | 10/1975 | Wambach ............................ 260/40 R |

OTHER PUBLICATIONS

Source Book of Industrial Solvents, vol. II, 1957, pp. 194 to 202, Reinhold Publ. Corp. N. Y.
Encyclopedia of Polymer Science and Technology, vol. 10, pp. 281 to 283 (1970).
Encyclopedia of Polymer Science and Technology, vol. 12, pp. 32 to 34 (1970).

*Primary Examiner*—Melvyn I. Marquis
*Attorney, Agent, or Firm*—Morgan, Finnegan, Pine, Foley & Lee

[57] ABSTRACT

Novel thermoplastic molding compositions are disclosed which comprise a polycarbonate and a halocarbon oil, wax or grease.

14 Claims, No Drawings

POLYCARBONATE COMPOSITIONS

This invention provides a novel thermoplastic molding composition which comprises a polycarbonate and from about 0.05 to 20 weight percent of a halocarbon.

BACKGROUND OF THE INVENTION

The use of polycarbonate resins in admixture with various other additive components are well known and are currently widely employed in the manufacture of various thermoplastic molded articles.

In the process of extruding a composition for use in various molding techniques, such as, injection molding, compression molding, foam molding, extrusion and similar operations, the characteristics of melt flow is important as a measure of the relative amount of work energy input required to satisfactorily manipulate the molding composition.

Various additives have been utilized to increase the melt flow characteristics of molding compositions with varying degrees of success.

In the extrusion and molding of polycarbonates generally, it is desirable to obtain a molded product which retains a high degree of transparency. Consequently, it is a desirable object to obtain a suitable additive component in admixture with polycarbonate molding resins which component will improve the melt flow characteristic of such polycarbonates and, at the same time, allow the production of transparent molded products.

It has now been found that the incorporation of an amount of halocarbon oil, wax or grease into a polycarbonate molding resin substantially increases the melt flow characteristic of the resultant mixture while, at the same time, allowing for the production of transparent molded products.

DESCRIPTION OF THE INVENTION

The present invention provides for a novel thermoplastic molding composition which comprises (a) a polycarbonate resin; and
(b) a halocarbon oil, wax or grease.

The polycarbonate resin has recurring units of the formula

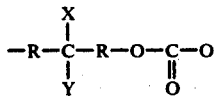

wherein each —R— is selected from the group consisting of phenylene, halo-substituted phenylene and alkyl substituted phenylene, and X and Y are each selected from the group consisting of hydrogen, hydrocarbon radicals free from aliphatic unsaturation and of radicals which together with the adjoining

atom form a cycloalkane radical, the total number of carbon atoms in X and Y being up to 12.

The preferred polycarbonate resins may be derived from the reaction of bisphenol-A and phosgene. These polycarbonates have from 10–400 recurring units of the formula:

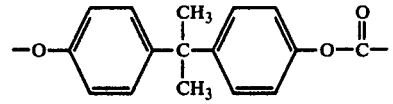

The polycarbonates are described in U.S. Pat. Nos. 3,028,365; 3,334,154 and 3,915,926 all of which are incorporated by reference. The polycarbonte should have an intrinsic viscosity between 0.3 and 1.0, preferably from 0.45 to 0.65 as measured at 20° C. in methylene chloride.

The halocarbon oil, wax or grease is comprised of saturated low molecular weight polymers of chlorotrifluoroethylene having the general repeating formula

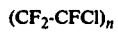

and appropriate end cappers, stabilizers and gelling agents.

The compositions of the present invention will preferentially comprise from about 0.05 to about 20 weight percent of the halocarbon component and may be prepared by and standard procedure.

The particular method employed in the preparation of the compositions of the present invention are not considered critical.

The compositions of the present invention may also include various flame retardants such as, the metal salts of diphenylsulfone sulfonate, decabromodiphenyl ether, and other similar known fire retardants, such as those described in U.S. Pat. No. 3,915,926, which is incorporated herein by reference.

The composition of the present invention may also include various reinforcing agents which may be selected from finely divided aluminum, iron or nickel and the like, and non-metals, such as carbon filaments, silicates, such as acicular calcium silicate, clay, asbestos, titanium dioxide, wollastonite, potassium titanate and titanate whiskers, glass beads flakes and fibers.

Although it is only necessary to use a reinforcing amount of the reinforcing agent, from 1–60 parts by weight of the total weight of the composition may comprise the reinforcing agent. A preferred range is from 5–40 parts by weight.

The preferred reinforcing agents are of glass, and it is preferred to use fibrous glass filaments. The preferred filaments for plastics reinforcement are made by mechanical pulling. The filament diameters range from about 0.000112 to about 0.00075 inch, but this is not critical to the present invention.

The composition of the present invention may also include known stabilizers, fillers and colorants, as may be considered desirable in the molded end product.

DESCRIPTION OF THE INVENTION

The following examples are set forth to further illustrate the present invention and are not to be construed as limiting the invention thereto.

EXAMPLE I

A mixture of LEXAN ® 140 grade polycarbonate and 0.3 weight percent HALOCARBON ® oil 14–25 was prepared and extruded into pellets which were subsequently injection molded into ⅛ inch thick step chips. The molded chips were transparent.

EXAMPLE II

A mixture of LEXAN® 150 grade polycarbonate and 0.5 weight percent HALOCARBON® oil was prepared and the melt flow characteristic of this mixture compared to that of the LEXAN® 150 grade polycarbonate alone, the results were as follows:

| COMPOSITION | MELT FLOW |
|---|---|
| LEXAN® 150 Polycarbonate | 1.8 |
| LEXAN® 150 Polycarbonate plus 0.5 wt. % HALOCARBON® oil. | 2.0 |

EXAMPLE III

A mixture of LEXAN® 140 grade polycarbonate with 0.3 weight percent of HALOCARBON® oil was prepared, extruded and injection molded. The melt flow characteristic of the composition and the notched Izod impact characteristic of the molded article were compared to that of pure LEXAN® 140 grade polycarbonate which was processed in the same manner, the results were as follows:

| COMPOSITION | MELT FLOW | NOTCHED IZOD IMPACT (ft.lbs./in.) |
|---|---|---|
| LEXAN® 140 Polycarbonate | 9.5 | 16.5 |
| LEXAN® 140 Plus 0.3 wt % HALOCARBON® oil. | 10.1 | 16.6 |

EXAMPLES IV

Mixtures of LEXAN® 140 grade polycarbonate and 1 weight percent HALOCARBON® oil or 1 weight percent HALOCARBON® wax were prepared, extruded and injection molded. The melt flow of the compositions and the notched Izod impact characteristic and light transmission quality of the molded articles were compared to that of LEXAN® 140 grade polycarbonate alone, the results were as follows:

| COMPOSITION | MELT FLOW | NOTCHED IZOD IMPACT (ft. lbs./in.) | LIGHT TRANS- MISSION (%) |
|---|---|---|---|
| LEXAN® 140 Polycarbonate | 11.1 | 16.7 | 88.6 |
| LEXAN® 140 Polycarbonate Plus 1.0 wt. % HALOCARBON® oil. | 12.0 | 16.7 | 89.6 |
| LEXAN® 140 Polycarbonate Plus 1.0% wt. % HALOCARBON® Wax | 11.8 | 16.7 | 89.6 |

Although the above examples show various modifications of the present invention, other variations are possible in light of the above teachings. It is, therefore, to be understood that changes may be made in the particular embodiments of the invention described which are within the full intended scope of the invention as defined by the appended claims.

We claim:

1. A thermoplastic molding composition comprising a polycarbonate resin and a halocarbon oil, wax or grease, comprised of polymers of chlorotrifluoroethylene having the general repeating formula $$(CF_2\text{---}CFCl)_n$$

2. A thermoplastic molding composition comprising a polycarbonate resin and a halocarbon comprised of saturated low molecular weight polymers of chlorotrifluoroethylene having the general repeating formula $$(CF_2\text{---}CFCl)_n$$

3. The composition of claim 2 wherein the chlorotrifluoroethylene component contains an appropriate end capping agent.

4. The composition of claim 2 wherein the chlorotrifluoroethylene component contains an appropriate stabilizing agent.

5. The composition of claim 2 wherein the chlorotrifluoroethylene component contains an appropriate gelling agent.

6. A thermoplastic molding composition as defined in claim 1 wherein the polycarbonate consists essentially of recurring units of the formula:

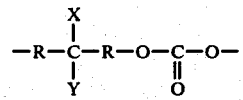

wherein each —R— is selected from the group consisting of phenylene, halo-substituted phenylene and alkyl substituted phenylene and X and Y are each selected from the group consisting of hydrogen, hydrocarbon radicals free from aliphatic unsaturation and of radicals which together with the adjoining

atom from a cycloalkane radical, the total number of carbon atoms in X and Y being up to 12.

7. A thermoplastic molding composition as defined in claim 6 wherein the polycarbonate has the repeating unit

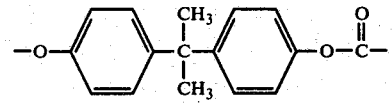

8. A thermoplastic molding composition as defined in claim 7 wherein the polycarbonate resin consists of from 10 to 400 repeating units.

9. A thermoplastic molding composition as defined in claim 1 which includes a flame-retardant amount of a flame-retardant agent.

10. A thermoplastic molding composition as defined in claim 1 which includes a flame retardant amount of a metal salt of diphenylsulfone sulfonate.

11. A thermoplastic molding composition as defined in claim 1 which includes a flame retardant amount of decabromodiphenyl ether.

12. A thermoplastic molding composition as defined in claim 1 which includes a reinforcing amount of fibrous glass filaments.

13. The thermoplastic molding composition of claim 12 wherein the fibrous glass filaments have diameters ranging from 0.000112 to about 0.00075 inch.

14. The thermoplastic molding composition of claim 1 wherein the halocarbon component is present in an amount from 0.05 to about 20 weight percent.

* * * * *